Patented Oct. 17, 1933

UNITED STATES PATENT OFFICE 1,930,471

MANUFACTURE OF CELLULOSE DERIVATIVES

Henry Dreyfus, London, England

No Drawing. Application November 18, 1930, Serial No. 496,572, and in Great Britain December 18, 1929

14 Claims. (Cl. 260—152)

This invention relates to the manufacture of halogen-containing cellulose ethers and is a continuation in part of my prior U. S. application S. No. 492,363 filed Oct. 30, 1930, corresponding to British application No. 36474/29.

The said U. S. application S. No. 492,363 corresponding to British application No. 36474/29 describes inter alia the manufacture of new halogen containing cellulose ethers by replacing the hydroxy groups of hydroxy-containing cellulose ethers by halogen atoms, e. g. by treatment with thionyl chloride. The present invention is concerned with new methods for the preparation of these new halogen-containing cellulose ethers.

According to the present invention halogen-containing cellulose ethers are prepared by reacting upon cellulose or cellulose-containing materials with reagents containing an etherifying atom or group, and in addition at least one halogen atom. The etherifying group may itself be a halogen atom or it may be an alkylene oxide group. Thus the etherifying agents of the present invention may be bodies of the type of epichlorhydrin or aliphatic compounds containing two or more halogen atoms. Where etherification is effected by means of a halogen atom or atoms the compound employed should contain some halogen atoms which are less reactive than others, or should be used under such conditions that etherification does not result in the elimination of all halogen atoms. Preferably I employ bodies containing different halogen atoms, as for example ethylene chlorobromide $CH_2.Cl.CH_2.Br.$, 2.2-dichlor-1-brom-ethane, 1-chlor-2-iodo-ethane, 2-chlor-1-brom-propane, 3-chlor-1-brom-propane and the like. Bodies containing the same halogen atoms are in general more difficult to bring to reaction with cellulose to produce halogen-containing cellulose ethers. For example ethylene dichloride when brought to reaction with cellulose in the presence of alkali usually gives products which do not contain chlorine. Ethylene di-bromide, on the other hand, can be brought to reaction with cellulose to yield a brom ethyl cellulose, particularly when the reaction is effected in presence of catalysts, such as copper, copper salts, or hydroxides, benzoyl peroxide and the like.

The etherification, in the case of using an alkylene oxide group as the etherifying agent, should be effected in the absence of alkali. Agents containing halogen atoms as the etherifying constituent should on the other hand be used in the presence of bases, preferably inorganic. The best results are obtained by effecting such an etherification in presence of strong caustic alkali, for example alkali of 40 to 50% concentration. The water present during such etherification is preferably reduced as much as possible, for example by use of strong caustic alkali in excess of that which will dissolve in the water present or by addition of substances adapted to bind water chemically, e. g. lime, as described in U. S. patent specification No. 1,542,541. Thus for example the caustic alkali present is preferably in excess of three times the weight of the water present, and may be up to 19 or more times its weight, particularly where cellulose ethers of high ether content are required. The cellulose may, for example, be kneaded with saturated caustic alkali solution and powdered caustic alkali worked in together with the etherifying agent, e. g. ethylene chlorobromide, or the alkali and etherifying agent may be added separately. To obtain a high ether content the etherification may be conducted in two or more stages, whatever be the type of etherifying agent employed. Catalysts, for example copper powder, copper hydroxides or salts, may be present to accelerate or further the etherification.

As starting materials cotton or other cellulosic materials or near conversion products thereof, e. g. the regenerated type of artificial fibre, or wood pulps, and preferably chemical wood pulps, such as sulphite pulp, sulphate pulp or soda pulp containing substantially no lignin, pentosan, resin or like constituents may be used. Such cellulosic materials may be subjected to a pre-treatment prior to the etherification particularly when the etherification is to be effected with an alkylene oxide type of etherifying agent. Such pretreatments may take the form of a simple treatment with organic acids, for example acetic acid or formic acid, or a treatment with caustic or other alkali or a treatment with mineral acids, for example sulphuric acid or hydrochloric acid; or a combination of any of the above pretreatments may be applied. Mineral or organic acids may be substantially removed prior to the etherification, and in the case of etherifying with alkylene oxide reagents any strong alkali should also be substantially removed, for example by washing.

As described in my U. S. application Serial No. 492,363 previously referred to, the halogen-containing ethers of cellulose may be treated with ammonia or with aliphatic, aromatic or other organic amines to obtain amino-ethers of cellulose having an affinity for acid dyestuffs. For instance the halogen-containing cellulose ethers may be treated with ammonia, preferably under pressure, or may be boiled with an aliphatic or aromatic amine in presence of a solvent or non-solvent diluent for the cellulose ether treated. For example, the halogen-containing ether may be heated in a closed container with excess of concentrated ammonia solution at a temperature of 100 to 110° C. Alternatively the halogen-containing cellulose ether may be heated with excess of aniline under a reflux condenser for half an hour during which the mixture is boiled, after which the mixture is allowed to cool and the cellulose derivative is precipitated and washed with water.

The following examples show the best methods known to me for carrying the invention into effect, but they are not to be considered as limiting the invention in any way:—

*Example 1*

162 parts of cotton linters or of purified wood pulp are impregnated with 300 parts of a 50% aqueous solution of caustic soda, the whole being well kneaded for a period of 1–2 hours. During a further hour an additional 170 parts of powdered caustic soda are worked in. 400 parts of ethylene chlorobromide are then added gradually and the mass worked form 2–4 hours while maintaining the temperature at 20–40° C. Further caustic soda is now added in an amount of about 160 parts together with a further 400 parts of ethylene chlorobromide and the reaction allowed to proceed at the same or a slightly higher temperature for another 2–4 hours. An additional etherifying stage similar to the second stage may then be applied if desired, the temperature being allowed to rise to as much as 60° C. The product is then washed with several changes of alcohol and dried. It is similar in properties to the product obtained according to my U. S. application previously referred to by treating hydroxyethel cellulose with thionyl chloride, and may be described in that application be treated with ammonia or organic amines to obtain the corresponding amino derivative of cellulose.

*Example 2*

Wood pulp which has been treated with alkali and with formic or acetic acid according to my U. S. Patent No. 1,711,110 or cotton linters which have been treated with liquid or vaporous formic or acetic acid according to my French Patent No. 565,654 or U. S. Patent 1,831,101 of Nov. 10, 1931 or with a mixture of acetic acid with sulphuric or hydrochloric acid is well washed, first with aqueous methylated spirit and then with absolute alcohol or methylated spirit. It is then allowed to steep overnight in excess of epichlorhydrin. The steeped mass is then gently refluxed with about 6–10 times its weight of epichlorhydrin for 4–8 hours or until a gain in weight corresponding with the formation of the required ether is obtained. Thus the cellulose may undergo an increase in weight of 100–170%. The higher etherification products are soluble in chloroform-alcohol.

What I claim and desire to secure by Letters Patent is:—

1. Process for the production of cellulose derivatives, comprising treating cellulose in the presence of a base in an amount and concentration sufficient to react with the cellulose in conjunction with an etherifying agent containing different halogen atoms so that a halogen-containing cellulose ether is produced.

2. Process for the production of cellulose derivatives, comprising treating cellulose in the presence of a base in an amount and concentration sufficient to react with the cellulose in conjunction with an etherifying agent containing both chlorine and bromine so that a halogen-containing cellulose ether is produced.

3. Process for the production of cellulose derivatives, comprising treating cellulose in the presence of a base in an amount and concentration sufficient to react with the cellulose in conjunction with an ethylene chloro-bromide so that a halogen-containing cellulose ether is produced.

4. Process for the production of cellulose derivatives, comprising treating cellulose in the presence of caustic alkali with an etherifying agent containing different halogen atoms so that a halogen-containing cellulose ether is produced.

5. Process for the production of cellulose derivatives comprising treating cellulose in the presence of caustic alkali with an etherifying agent containing both chlorine and bromine so that a halogen-containing cellulose ether is produced.

6. Process for the production of cellulose derivatives, comprising treating cellulose in the presence of caustic alkali with an ethylene chloro-bromide so that a halogen-containing cellulose ether is produced.

7. Process for the production of cellulose derivatives, comprising treating cellulose in the presence of sufficient caustic alkali to form a concentrated solution with any water present with an etherifying agent containing different halogen atoms so that a halogen-containing cellulose ether is produced.

8. Process for the production of cellulose derivatives, comprising treating cellulose in the presence of sufficient caustic alkali to form a concentrated solution with any water present with an etherifying agent containing both chlorine and bromine so that a halogen-containing cellulose ether is produced.

9. Process for the production of cellulose derivatives, comprising treating cellulose in the presence of sufficient caustic alkali to form a concentrated solution with any water present with an ethylene chloro-bromide so that a halogen-containing cellulose ether is produced.

10. Brom alkyl ether of cellulose.

11. Brom ethyl ether of cellulose.

12. Process for the production of nitrogen containing cellulose derivatives, comprising treating cellulose in the presence of a base in an amount and concentration sufficient to react with the cellulose in conjunction with an etherifying agent containing different halogen atoms so that a halogen containing ether is produced and then reacting the halogen containing ether with a compound selected from the group consisting of ammonia and organic amines.

13. Process for the production of cellulose derivatives, comprising treating cellulose in the presence of sufficient caustic alkali to form a concentrated solution with any water present with an etherifying agent containing both chlorine and bromine so that a halogen-containing cellulose ether is produced and then reacting the halogen containing ether with a compound selected from the group consisting of ammonia and organic amines.

14. Process for the production of cellulose derivatives, comprising treating cellulose in the presence of sufficient caustic alkali to form a concentrated solution with any water present with an ethylene chloro-bromide so that a halogen-containing cellulose ether is produced and then reacting the halogen containing ether with a compound selected from the group consisting of ammonia and organic amines.

HENRY DREYFUS.